(12) United States Patent
Montojo et al.

(10) Patent No.: US 9,036,520 B2
(45) Date of Patent: May 19, 2015

(54) MULTIPLEXING OF CONTROL AND DATA WITH VARYING POWER OFFSETS IN A SC-FDMA SYSTEM

(75) Inventors: Juan Montojo, San Diego, CA (US); Xiaoxia Zhang, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 531 days.

(21) Appl. No.: 12/443,968

(22) PCT Filed: Oct. 30, 2007

(86) PCT No.: PCT/US2007/082931
§ 371 (c)(1),
(2), (4) Date: Jul. 2, 2009

(87) PCT Pub. No.: WO2008/057843
PCT Pub. Date: May 15, 2008

(65) Prior Publication Data
US 2010/0027450 A1 Feb. 4, 2010

Related U.S. Application Data

(60) Provisional application No. 60/863,960, filed on Nov. 1, 2006.

(51) Int. Cl.
*H04W 72/08* (2009.01)
*H04L 1/00* (2006.01)
(Continued)

(52) U.S. Cl.
CPC .......... *H04W 72/085* (2013.01); *H04L 1/0017* (2013.01); *H04L 1/007* (2013.01);
(Continued)

(58) Field of Classification Search
None
See application file for complete search history.

(56) References Cited

U.S. PATENT DOCUMENTS

| | | | |
|---|---|---|---|
| 5,604,730 | A | 2/1997 | Tiedemann, Jr. |
| 7,221,680 | B2 | 5/2007 | Vijayan et al. |

(Continued)

FOREIGN PATENT DOCUMENTS

| | | |
|---|---|---|
| EP | 1215833 | 6/2002 |
| EP | 1681790 | 7/2006 |

(Continued)

OTHER PUBLICATIONS

Partial International Report—PCT/US07/082931, International Searching Authority—European Patent Office, Jun. 23, 2008.
(Continued)

*Primary Examiner* — Faruk Hamza
*Assistant Examiner* — Diane Lo
(74) *Attorney, Agent, or Firm* — Dalei Dong

(57) ABSTRACT

Systems and methodologies are described that facilitate multiplexing of control information and data for common transmission in a localized FDM wireless communication system. Localized FDM transmission of control and data channels can be achieved by, for example, multiplexing control information with data and transmitting the control information and data using resources and transmission schemes specified for transmission of the data. To ensure the reliability of control information multiplexed with data, a power offset can be applied to the control information to provide varying protection levels for the control information based on properties of the data resources into which it is embedded in order to maintain a predetermined signal quality for the control information independent of the data resources.

24 Claims, 10 Drawing Sheets

(51) Int. Cl.
*H04L 1/16* (2006.01)
*H04L 5/00* (2006.01)
*H04L 27/00* (2006.01)
*H04L 27/26* (2006.01)
*H04W 52/26* (2009.01)
*H04W 52/28* (2009.01)
*H04W 52/34* (2009.01)
*H04L 25/02* (2006.01)
*H04B 7/26* (2006.01)
*H04L 1/12* (2006.01)
*H04J 1/02* (2006.01)

(52) U.S. Cl.
CPC ........... *H04L 1/1692* (2013.01); *H04L 5/0007* (2013.01); *H04L 5/0023* (2013.01); *H04L 5/0039* (2013.01); *H04L 5/0053* (2013.01); *H04L 5/006* (2013.01); *H04L 5/0064* (2013.01); *H04L 25/0228* (2013.01); *H04L 27/0008* (2013.01); *H04L 27/2604* (2013.01); *H04L 27/2613* (2013.01); *H04L 2001/125* (2013.01); *H04W 52/262* (2013.01); *H04W 52/286* (2013.01); *H04W 52/34* (2013.01); *H04B 7/2621* (2013.01); *H04J 1/02* (2013.01)

(56) References Cited

U.S. PATENT DOCUMENTS

| | | | |
|---|---|---|---|
| 2002/0115443 A1* | 8/2002 | Freiberg et al. | 455/450 |
| 2003/0039217 A1* | 2/2003 | Seo et al. | 370/318 |
| 2003/0040274 A1 | 2/2003 | Dai et al. | |
| 2004/0001472 A1 | 1/2004 | Kwak et al. | |
| 2004/0085989 A1 | 5/2004 | Boumendil et al. | |
| 2004/0229641 A1 | 11/2004 | Takagi | |
| 2005/0181816 A1* | 8/2005 | Han et al. | 455/522 |
| 2006/0078075 A1 | 4/2006 | Stamoulis et al. | |
| 2006/0121856 A1 | 6/2006 | Itoh et al. | |
| 2006/0262871 A1* | 11/2006 | Cho et al. | 375/260 |
| 2014/0301311 A1 | 10/2014 | Montojo et al. | |

FOREIGN PATENT DOCUMENTS

| | | |
|---|---|---|
| JP | 2004297231 A | 10/2004 |
| RU | 2253947 C2 | 6/2005 |
| WO | WO03043228 A1 | 5/2003 |
| WO | WO-2005022811 A2 | 3/2005 |
| WO | WO2005041515 | 5/2005 |
| WO | 2006007318 | 1/2006 |
| WO | 2006094299 | 9/2006 |
| WO | 2006096784 | 9/2006 |

OTHER PUBLICATIONS

International Search Report and Written Opinion, PCT/US2007/082931, European Patent Office, Oct. 31, 2008.

Taiwan Search Report—TW096141220—TIPO—Sep. 25, 2011.

* cited by examiner

MULTIPLEXING OF CONTROL AND DATA WITH VARYING POWER OFFSETS IN A SC-FDMA SYSTEM

CROSS-REFERENCE

This application claims the benefit of U.S. Provisional Application Ser. No. 60/863,960, filed Nov. 1, 2006, and entitled "A METHOD AND APPARATUS FOR MULTIPLEXING OF CONTROL AND DATA WITH VARYING POWER OFFSETS IN A SC-FDMA SYSTEM," the entirety of which is incorporated herein by reference.

BACKGROUND

I. Field

The present disclosure relates generally to wireless communications, and more specifically to techniques for conducting control and data transmissions in a wireless communication system.

II. Background

Wireless communication systems are widely deployed to provide various communication services; for instance, voice, video, packet data, broadcast, and messaging services may be provided via such wireless communication systems. These systems may be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-signal-out (MISO), or a multiple-in-multiple-out (MIMO) system.

In a single carrier system such as a Single Carrier FDMA (SC-FDMA) system, a transmission can be scheduled in frequency such that it spans a localized frequency band. Further, in the case of control transmission, one or more control channels can be variably mapped depending on whether other channels are present in order to preserve the single-carrier nature of a transmitted waveform. However, control channels subject to variable mapping can exhibit varying quality of service (QoS) depending on their mapped location within a transmitted waveform, which can cause degradation in overall system performance. Thus, there is a need to ensure that a given QoS for the control channels is maintained irrespective of their mapping to physical channels in a single carrier system.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for managing control information and data to be transmitted in a wireless communication system is described herein. The method can comprise receiving control information and data to be transmitted with the control information; applying a power offset to the control information, the power offset maintains a signal quality for the control information associated with a transmission of the control information without the data; and multiplexing the control information with the data.

Another aspect relates to a wireless communications apparatus that can comprise a memory that stores data relating to control signaling and data for communication in a common transmission and a baseline signal quality associated with control transmission. The wireless communications apparatus can further comprise a processor configured to offset power of the control signaling and to modulate the control signaling with the data, the offset provides a varying protection level for the control signaling to allow the control signaling to maintain the baseline signal quality upon multiplexing the control signaling with the data.

Yet another aspect relates to an apparatus that facilitates multiplexing of control and data with varying power offsets in a single-carrier wireless communication system. The apparatus can comprise means for identifying control information to be transmitted and data to be transmitted with the control information; means for determining a reference control signal quality associated with a transmission of control information without data; means for boosting the control information in power to maintain the reference control signal quality in a transmission of the control information and the data; and means for multiplexing the boosted control information with the data.

Still another aspect relates to a computer-readable medium, which can comprise code for causing a computer to receive data to be transmitted and a bandwidth and MCS specified for transmission of the data; code for causing a computer to receive control signaling to be transmitted with the data; code for causing a computer to compute a power offset for the control signaling based on the bandwidth and MCS specified for transmission of the data that preserves a reliability of the control signaling that would be achieved if the control signaling was transmitted without data; and code for causing a computer to embed the control signaling into the bandwidth specified for transmission of the data using the MCS specified for transmission of the data.

A further aspect relates to an integrated circuit that can execute computer-executable instructions for providing a varying protection level for control information to be transmitted with data in a wireless communication system. These instructions can comprise receiving control information and data to be transmitted in a common transmission; identifying one or more parameters associated with transmission of the data; computing a baseline quality level for the control information based on one or more parameters associated with transmission of control information without data; and offsetting a power used for the control information such that the control information maintains a quality level that is at least as high as the computed baseline quality level during a common transmission of the control information and the data.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter may be employed. Further, the disclosed aspects are intended to include all such aspects and their equivalents.

DETAILED DESCRIPTION

Figure 1:
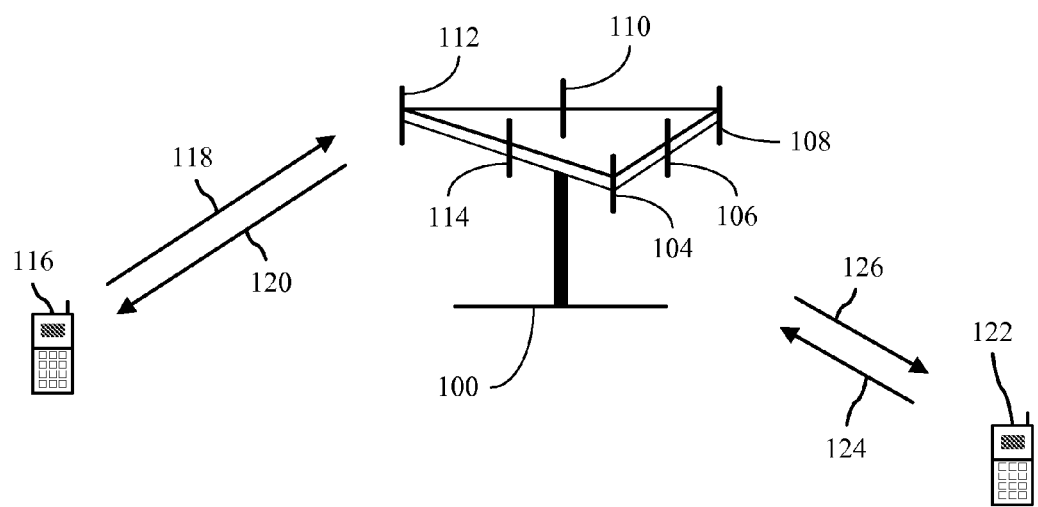
FIG. 1 illustrates a wireless multiple-access communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is an illustration of a wireless multiple-access communication system in accordance with various aspects. In one example, an access point 100 (AP) includes multiple antenna groups. As illustrated in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 can use different frequency for communication. For example, forward link 120 may use a different frequency then that used by reverse link 118.

Each group of antennas and/or the area in which they are designed to communicate can be referred to as a sector of the access point. In accordance with one aspect, antenna groups can be designed to communicate to access terminals in a sector of areas covered by access point 100. In communication over forward links 120 and 126, the transmitting antennas of access point 100 can utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, a Node B, an access network, and/or other suitable terminology. In addition, an access terminal, e.g., an access terminal 116 or 122, can also be referred to as a mobile terminal, user equipment (UE), a wireless communication device, a terminal, a wireless terminal, and/or other appropriate terminology.

Figure 2:
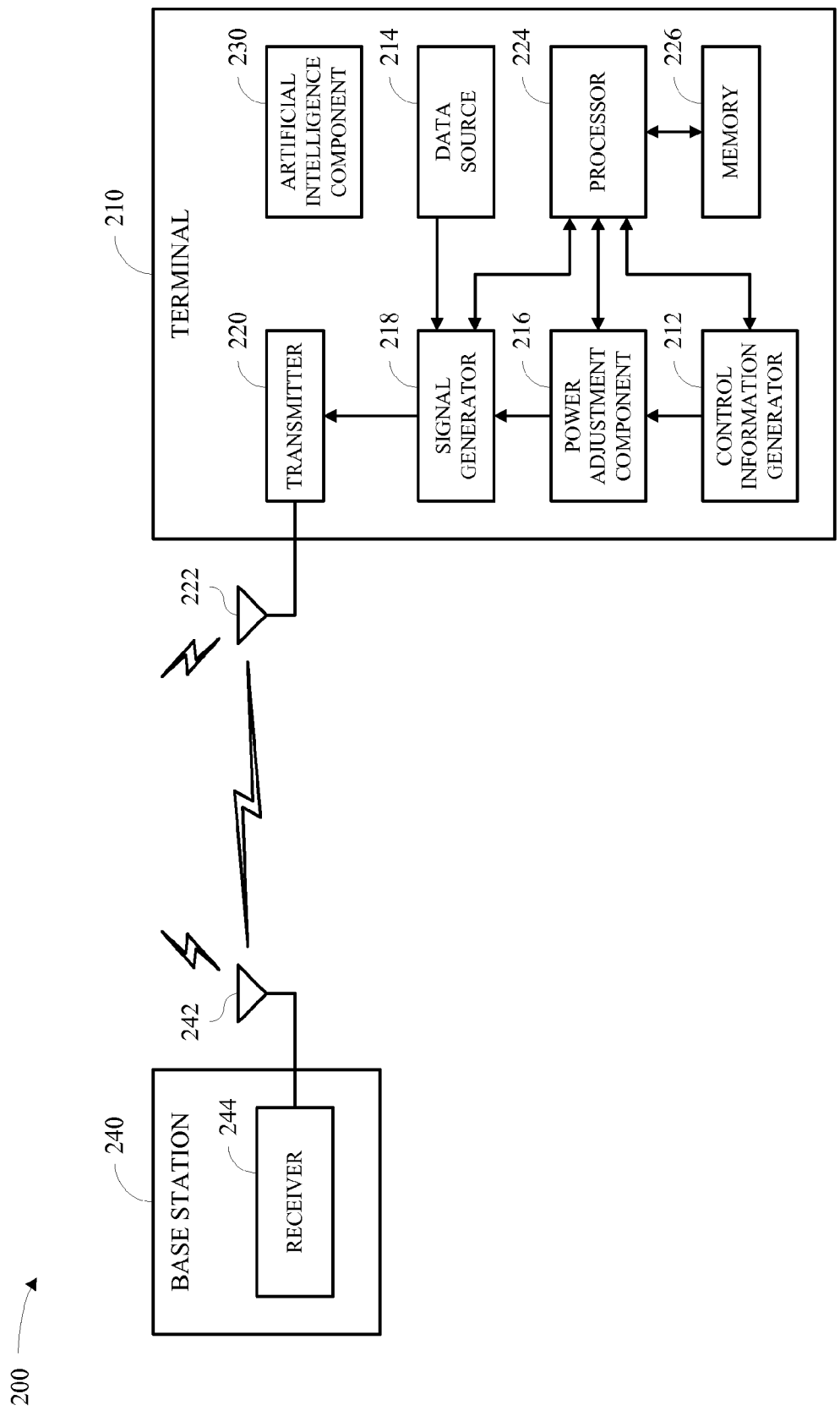
FIG. 2 is a block diagram of a system that facilitates multiplexing of control and data with varying power offsets in accordance with various aspects.

FIG. 2 is a block diagram of a system 200 that facilitates multiplexing of control and data with varying power offsets in accordance with various aspects described herein. System 200 can include one or more terminals 210 and one or more base stations 240, which can communicate on the forward and reverse links via respective antennas 222 and 242. As used herein and generally in the art, the forward link (or downlink) refers to the communication link from a base station to a terminal, and the reverse link (or uplink) refers to the communication link from a terminal to a base station. Further, although only one antenna is illustrated at terminal 210 and base station 240, it should be appreciated that terminal 210 and base station 240 can communicate using any number of antennas.

In accordance with one aspect, terminal 210 can communicate control signaling (e.g., acknowledgements (ACK), channel quality indicators (CQI), precoding matrix indicators (PMI), rank indications (RI), etc.) on one or more control channels and data on one or more data channels to base station 240 on the uplink. Control signaling can be generated by terminal 210 at, for example, a control information generator 212. Further, data can be provided at terminal 210 by, for example, a data source 214.

In one example, transmissions within system 200 can be constrained to a single-carrier waveform. Such constraints can exist, for example, in the case of a Single Carrier Frequency Division Multiple Access (SC-FDMA) system and/or another appropriate single carrier or localized multi-carrier system. As a result, data and control channels can be scheduled in frequency such that all channels scheduled for transmission at a given time occupy adjacent frequency subcarriers. For example, a bandwidth used by system 200 can have a reserved portion for control transmission. This reserved portion can be located, for example, at one or more edges of the system bandwidth to maximize frequency diversity for control transmissions. Data transmissions can then, for example, be allowed to occupy the remainder of the system bandwidth.

In another example, control channels can be variably mapped within the bandwidth of system 200 such that control information to be transmitted at a common time period with data can be embedded into frequency resources reserved for data. This can be accomplished by, for example, multiplexing control information and data at a signal generator 218. Techniques by which control and data can be multiplexed are illustrated in further detail infra.

However, resources within a system bandwidth reserved for control signaling and resources reserved for data into which control signaling can be embedded can exhibit different properties, which can consequently alter the signal quality of transmitted control channels. For example, resources reserved for control transmission in system 200 can specify a fixed bandwidth, and modulation and coding scheme (MCS) to be used for transmissions using those resources. On the other hand, resources used for data transmission may utilize a variable bandwidth and MCS depending on the nature of the data to be transmitted and/or other factors. When transmitted separately, the transmit power spectral density (PSD) for control and data transmissions may be independently controlled to achieve a given QoS for the control and data transmissions. This can be done, for example, to account for the fact that data transmission benefits from HARQ (Hybrid Automatic Repeat reQuest) protection. More specifically, if a data transmission is not received correctly in a given transmission, it can be re-transmitted. On the other hand, transmissions of control information typically cannot benefit from HARQ as control information may rely on a given turn around time that prohibits its re-transmission. Thus, QoS of control information can be independently adjusted to facilitate effective one-time transmission of control information. Accordingly, when control information is embedded into a data transmission, the signal quality of the control information can vary depending on the resources scheduled for transmission of the data, which can reduce the reliability of the control information.

As a result, to ensure the reliability of control information multiplexed with data, terminal 210 can employ a power adjustment component 216 to apply a power offset to the control information. By doing so, the power adjustment component 216 can provide varying protection levels for the control information based on the bandwidth, MCS, and/or other properties of the data resources into which it is embedded in order to maintain a predetermined signal quality for the control information independent of the data resources and MCS.

By way of example, power adjustment component 216 can operate to apply a power offset to control information as follows. In accordance with one aspect, the power adjustment component 216 can adjust the power of information transmitted on one or more control channels such that a signal to noise ratio (SNR) on the control channels does not vary as and when data needs to be transmitted in the uplink. In one example, base station 240 can maintain a reference SNR based on a reference signal that is periodically transmitted (e.g., CQI or a sounding reference signal). Based on this reference SNR, a data SNR can depend on an assigned bandwidth for data transmission and a PSD offset that terminal 210 uses when it transmits data, which can be expressed as follows:

$$\left(\frac{E_s}{N_t}\right)_{data} = \left(\frac{E_s}{N_t}\right)_{reference} + 10 \cdot \log_{10}\left(\frac{W_{ref}}{W_{data}}\right) + \Delta_{data}, \quad (1)$$

where $W_{ref}$ is a reference bandwidth, $W_{data}$ is an assigned data bandwidth, and $\Delta_{data}$ is a PSD offset used for data transmission. Similarly, when only control information is transmitted, the control SNR can be expressed as follows:

$$\left(\frac{E_s}{N_t}\right)_{control} = \left(\frac{E_s}{N_t}\right)_{reference} + 10 \cdot \log_{10}\left(\frac{W_{ref}}{W_{control}}\right) + \Delta_{control}, \quad (2)$$

wherein $W_{control}$ is an assigned control bandwidth and $\Delta_{control}$ is a PSD offset used for transmission of only control information. It can be observed from Equations (1) and (2) that the PSD offsets for control and data already account for the fact that the interference PSD on the pre-allocated control and data frequency regions need not be the same. When both control and data are transmitted by, for example, multiplexing the control and data at signal generator 218 prior to a DFT operation, it should be ensured that the control SNR is at least what it would be if the control was transmitted without data. This can be expressed as follows:

$$\left(\frac{E_s}{N_t}\right)_{control} \geq \left(\frac{E_s}{N_t}\right)_{reference} + 10 \cdot \log_{10}\left(\frac{W_{ref}}{W_{data}}\right) + \Delta_{data}. \quad (3)$$

As a result, power adjustment 216 can choose a control power offset given by the following:

$$\delta_{control} \geq 10 \cdot \log_{10}\left(\frac{W_{control}}{W_{data}}\right) + \Delta_{data} - \Delta_{control}. \quad (4)$$

In one example, power adjustment component 216 can be configured to boost the power of control information by applying a default power offset of 0 dB to control information if a power offset calculated using Equation (4) is negative. It should be appreciated that assigned data bandwidth is typically greater than control bandwidth. Therefore, if the nominal PSD offset for control and data is the same, the default control power offset of 0 dB would be used.

In another example, control information provided by control information generator 212 can be boosted in power by power adjustment component 216 before it is multiplexed with data at signal generator 218. Alternatively, some or all of the functionality of power adjustment component 216 can be incorporated into signal generator 218 such that the power adjustment of control information is performed at signal generator 218. Upon multiplexing of control and data at signal generator 218, a resulting generated signal can then be transmitted to base station 240 and/or another suitable network entity via transmitter 220 and antenna 222 at terminal 210. Upon transmission, the signal can be received by base station 240 via antenna 242 and receiver 244.

Terminal 210 can further include a processor 224, which can interact with control information generator 212, power adjustment component 216, and/or signal generator 218 to implement some or all functionality of said components. Further, processor 224 can interact with memory 226. In addition, terminal 210 can further include an artificial intelligence (AI) component 230. The term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithm, and reinforced learning—to a set of available data (information) on the system. In particular, AI component 230 can employ one of numerous methodologies for learning from data and then drawing inferences from the models so constructed, e.g., hidden Markov models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches (that perform data fusion, etc.) in accordance with implementing various automated aspects described hereinafter.

Figure 3A:
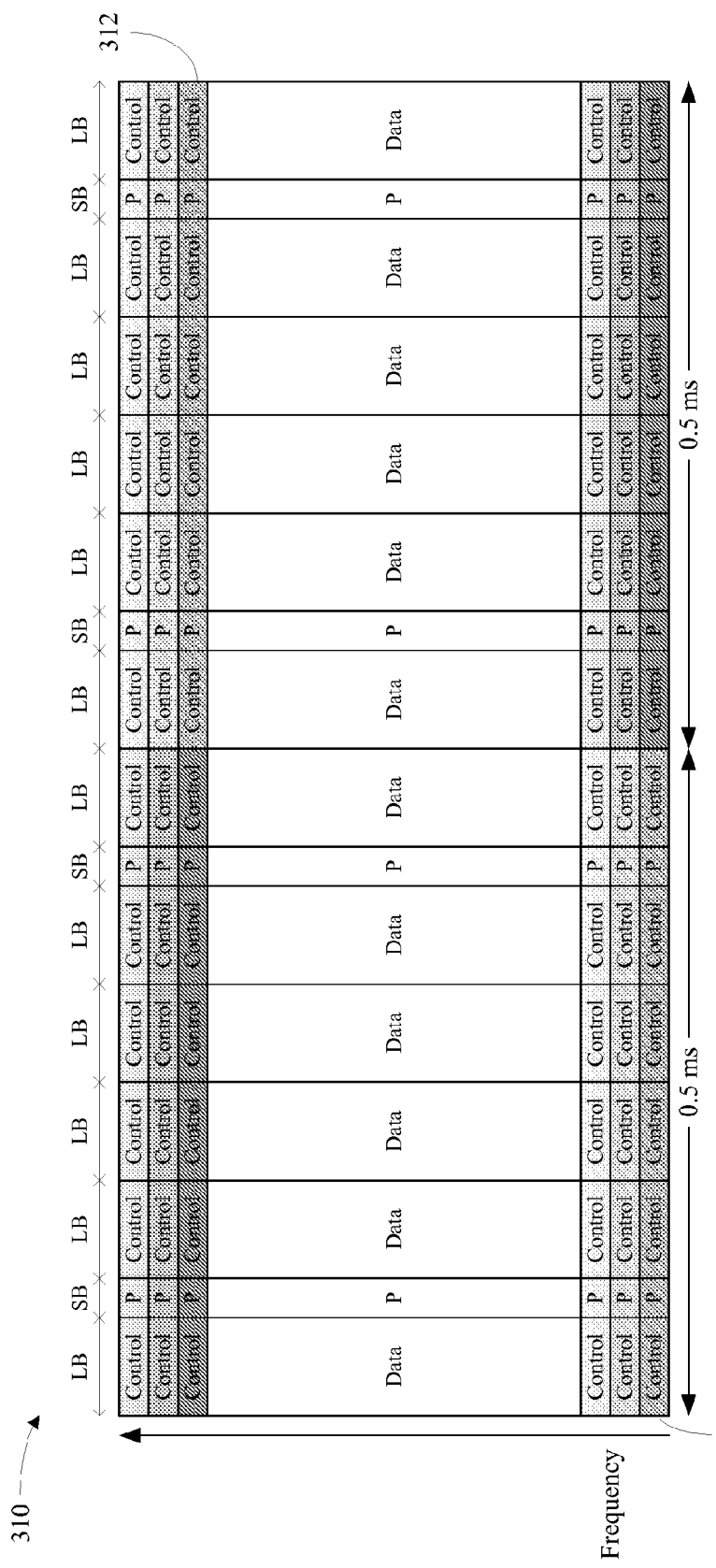
FIGS. 3A-3B illustrate example control and data transmission structures that can be employed in a wireless communication system in accordance with various aspects.
Figure 3B:
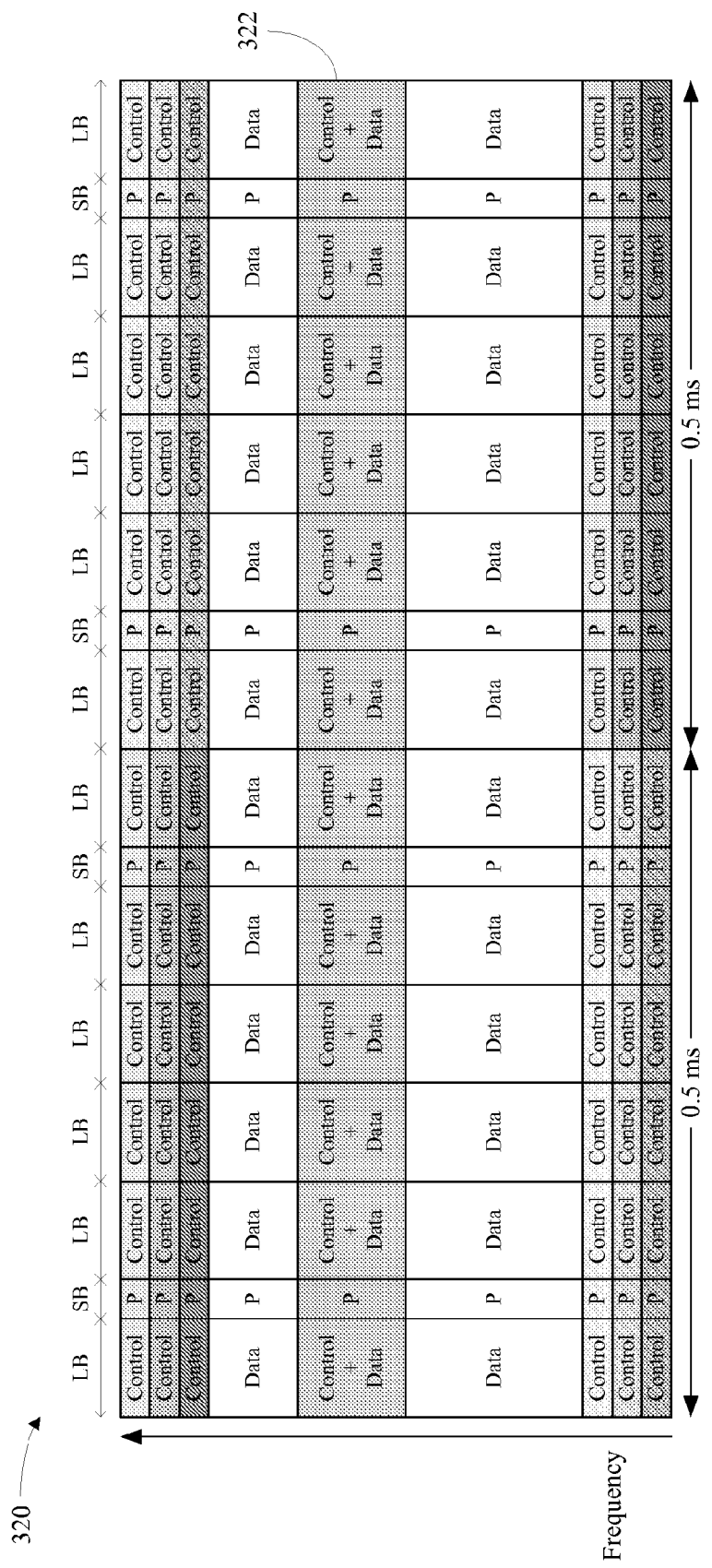

FIGS. 3A-B illustrate example control and data transmission structures 310-320 that can be employed in a wireless communication system in accordance with various aspects. In one example, transmission structures 310-320 illustrate an uplink control signaling structure that can be employed, for example, in a system using E-UTRA (Evolved UMTS (Universal Mobile Telecommunication System) Terrestrial Radio Access) and/or another appropriate wireless communication technology. Structures 310-320 can be used, for example, without requiring data-associated control; instead, a device employing structures 310-320 (e.g., a terminal 210) can obey a scheduler grant on a given MCS and bandwidth usage.

In accordance with one aspect, control and data can be multiplexed as illustrated by structures 310-320 such that the control spans an entire transmission time interval (TTI), which can be 1 ms in length or any other suitable length. In the event that no data is to be simultaneously transmitted with control information, frequency resources for control transmission can be assigned as follows. For example, for the transmission of an acknowledgement (ACK), an implicit mapping can be made between a downlink virtual resource block (RB) ID and a corresponding frequency/code location of the ACK. Such an implicit mapping can be utilized, for example, when the number of total number of ACKs to be transmitted is less than or equal to the number of virtual resource blocks assigned to a given device. As another example, for the transmission of CQI and/or MIMO support channels, transmission resources can be assigned based on pre-assigned frequency locations for such channels. In contrast, in the event that data is to be simultaneously transmitted with control information, the control information can be multiplexed along with the data in the resource block intended for the data. Further, the control and data can be multiplexed such that they span an entire TTI.

In the event that no data is to be simultaneously transmitted with control information, a waveform for the control information can be generated using, for example, frequency-hopped Localized Frequency Division Multiplexing (LFDM), such that the control waveform spans contiguous subcarriers and hops in frequency to maximize frequency diversity within a TTI. On the other hand, for a simultaneous transmission of data and control information, a control waveform can be generated based on the same LFDM structure as the data. In a further example, the control information can be structured using a hybrid FDM-CDM modulation scheme, wherein a small frequency domain CDM span (e.g., 60 KHz) can be employed per hop to retain orthogonality.

In accordance with one aspect, in the absence of a data transmission, control channels can be transmitted either in pre-assigned locations (e.g., CQI as described above) or as an implicit function of a downlink virtual resource block ID (e.g., ACK as described above) as illustrated by structures 310-320 in FIGS. 3A-3B. In the presence of a data transmission, the control channels can be multiplexed with data prior to a DFT operation at the transmitting device (e.g., terminal 210). Further, the control and data can be constructed to span an entire 1 ms TTI.

Turning specifically to FIG. 3A, a control structure 310 that can be utilized in the absence of any data transmission for a given user is illustrated. As illustrated in structure 310, reserved control resources 312 can be employed for control information transmitted in the absence of data transmission. It can be observed from structure 310 that frequency hopping can be performed such that it maximizes intra-TTI frequency diversity. Referring next to FIG. 3B, a control structure 320 that can be utilized when a user transmits data in the same TTI is illustrated. As illustrated by structure 320, the control information can be multiplexed with data to occupy data resources 322. Further, it can be observed that for both structures 310 and 320, control information is transmitted during the entire 1 ms TTI.

Figure 4:
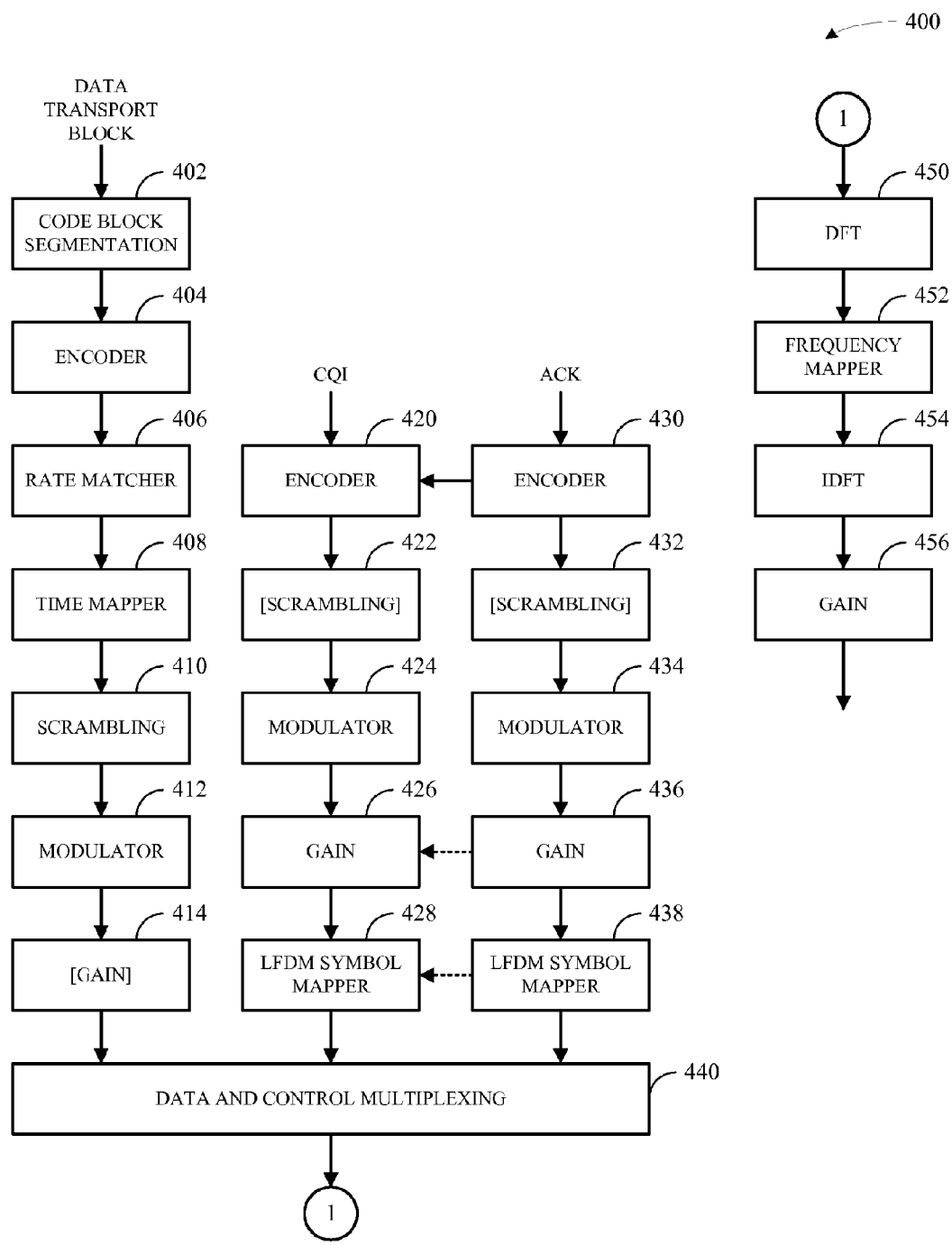
FIG. 4 illustrates an example control and data multiplexing transmission chain in accordance with various aspects.

FIG. 4 is a block diagram of a system 400 that implements an example control and data multiplexing transmission chain in accordance with various aspects. In accordance with one aspect, uplink transmissions within a wireless communication system can be constrained to a single carrier waveform, which is to be respected irrespective of whether control only, data only, or control and data both are transmitted in a given subframe. Accordingly, an uplink control channel (e.g., a Physical Uplink Control Channel (PUCCH)) conveying CQI and/or ACK information can be given independent resources at the system band edges to be used when no data transmission occurs in a given subframe, as illustrated by structures 310-320 in FIGS. 3A-3B supra. In one example, when there is data transmission in a subframe, system 400 and/or another appropriate system can be utilized to multiplex the control with the data (e.g., data on a Physical Uplink Shared Channel (PUSCH)) within the physical layer (PHY) resources allocated for the data, leaving the reserved control resources unused.

In accordance with one aspect, system 400 can be utilized to multiplex control and data when both are transmitted over resources allocated for data. In relation to terminal 210 illustrated in FIG. 2, system 400 can be employed, for example, as one or more of a power adjustment component 216, a signal generator 218, a processor 224, and or any other suitable component(s).

As a non-limiting example illustrated by system 400, control and data can be multiplexed by system 400 at the modulation symbol level. In such an example, fixed coding and modulation can be used for the control portion of a transmission, and different protection levels for the control information can be achieved by way of applying power offsets to the control information with respect to the data portion of the transmission. Alternatively, a similar system to that illustrated by system 400 could be utilized to multiplex control and data at the coded symbol level. In such a system, the coding of the control information can depend on a MCS used for the data. A stream with control and data multiplexed can be scrambled and modulated together, and the power gain on the transmission can be agnostic of whether control or data modulation symbols are transmitted.

In accordance with one aspect, a data transport block can be multiplexed with CQI information, one or more ACK indications, and/or other control signaling using a control and data multiplexing transmission chain implemented by system 400 as follows. A data transport block can be initially processed by a code block segmentation component 402 to segment the data into blocks for encoding. Blocks created by code block segmentation component 402 can then be encoded by an encoder 404. After code blocks of data are encoded at block 404, they can be processed by a rate matcher 406. In one example, a data channel can be rate matched at rate matcher 406 around CQI, Sounding Reference Signal (SRS), and/or other appropriate transmissions. In another example, ACK and/or Negative ACK (NAK) transmissions do not affect the rate matching performed by rate matcher 406. Alternatively, ACK and/or NAK transmissions can affect rate matching at rate matcher 406 to facilitate discontinuous reception (DRX) and/or to reduce overhead associated with highly asymmetric uplink/downlink partitioning in, for example, a TDD system.

After respective coded blocks are processed by rate matcher 406, they can be further processed by a time mapper 408. At time mapper 408, the coded and rate matched blocks can be concatenated. Further, interleaving can be performed for one or more data channels on which the data are to be transmitted. Data processed by time mapper 408 can then be scrambled by a scrambler 410 and modulated by a modulator 412 before multiplexing with control at multiplexer 440. Additionally, modulated data can optionally be processed by a gain stage 414 prior to multiplexing with control at multiplexer 440, wherein a power offset can be applied to the data.

In accordance with another aspect, CQI information, ACK indication(s), and/or other control signaling can be multiplexed with data by system 400 as follows. CQI and ACK information can first be encoded by respective encoders 420 and 430. In one example, CQI content and a number of CQI bits encoded at encoder 420 can depend on an uplink grant. For example, if an uplink grant is larger, a larger number of bits can be allocated for CQI transmission. In another example, coding applied to CQI and ACK/NAK information at encoders 420 and 430 can be fixed irrespective of a MCS used for data.

After encoding at encoders 420 and 430, the CQI and ACK information can then optionally be scrambled at scramblers 422 and/or 432. If scrambling is performed for the control information, such scrambling can be independent of scrambling performed for data. Alternatively, scrambling can be performed for both control and data after multiplexing is performed at multiplexer 440. CQI and ACK/NAK information can then be modulated at respective modulators 424 and 434 using, for example, a fixed modulation format that is irrespective of a modulation scheme used for data. Thus, different modulation symbols for control and data can utilize different modulation schemes. The modulated control information can then pass through a gain stage 426 and/or 436, wherein a power offset is applied to the control information to provide different protection levels for the control information to ensure its signal quality in the multiplexed transmission. In one example, gain stages 426 and/or 436 can be dependent on the MCS specified for the data in an uplink grant. Further, gain stages 426 and/or 436 can occur before control-data multiplexing at multiplexer 440 or after multiplexing, in which case a common power offset can be applied to both the control and data. The control information can then be symbol mapped at respective Localized FDM (LFDM) symbol mappers 428 and 438 for multiplexing with data at multiplexer 440.

In one example, data and control multiplexing is performed at multiplexer 440 such that modulation symbols for control information are placed in each LFDM symbol used for data channel transmission. This can be done, for example, to ensure transmission of control information in LFDM symbols of both slots in a given subframe in order to allow the transmission to benefit from the frequency diversity that could be available for a hopped transmission. It should further be appreciated that, in one example, the transmission of CQI does not compete with data transmission due to the fact that the data channel is rate matched around the CQI at rate matcher 406. In the event that rate matcher 406 does not rate match the data channel around ACK/NAK transmission, the ACK transmission can puncture the data at multiplexer 440.

In another example, once the control and data are multiplexed together at multiplexer 440, the multiplexed stream of control and data symbols can be prepared for a common SC-FDMA transmission via DFT precoding at block 450, frequency mapping at block 452, and an IDFT operation at block 454. In addition, the multiplexed signal can undergo an additional gain stage at block 456 in the event that the data did not undergo an individual gain stage at block 414 prior to multiplexing at multiplexer 440.

Figure 5:
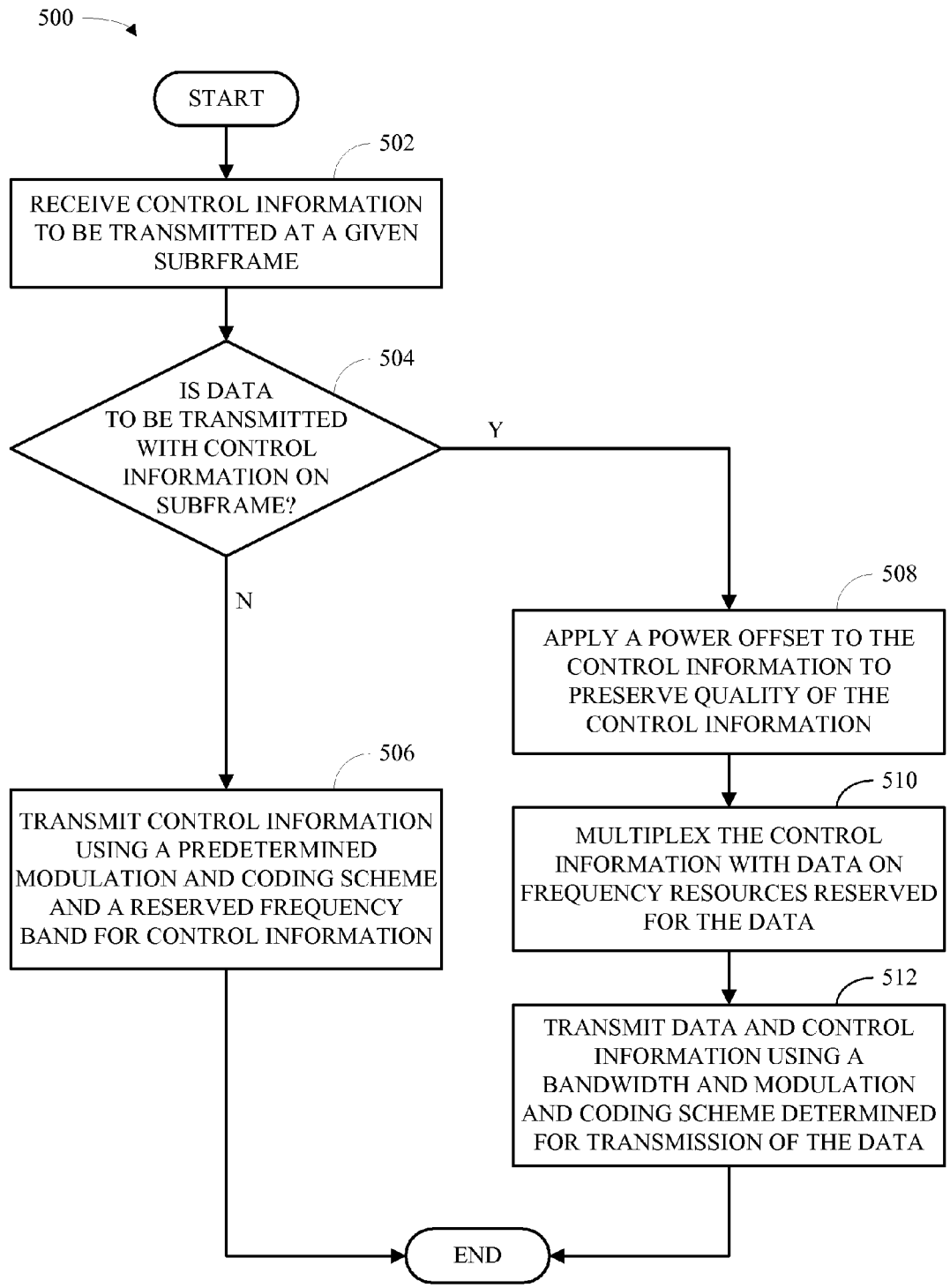
FIG. 5 is a flow diagram of a methodology for transmitting control information in a wireless communication system.
Figure 6:
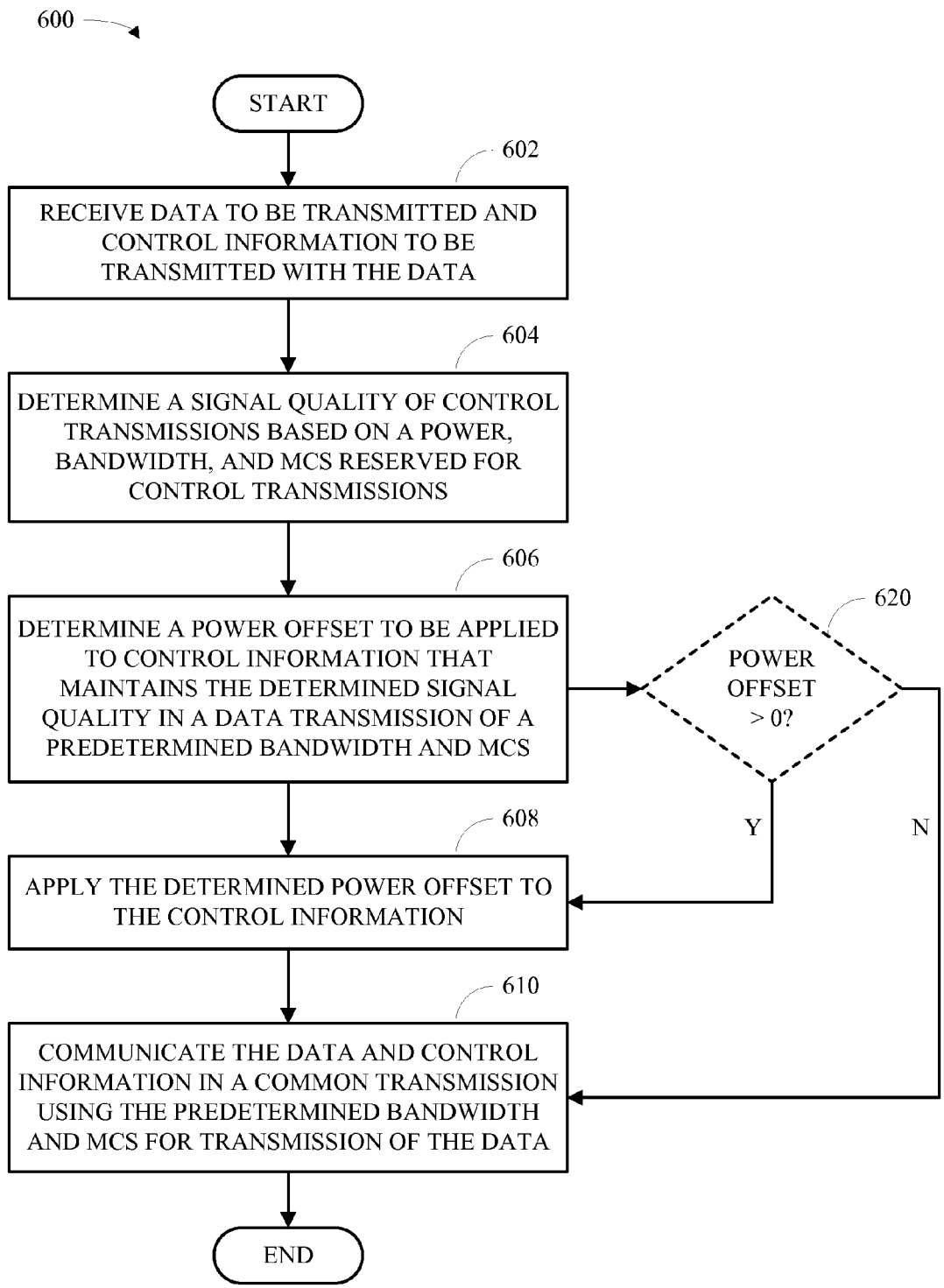
FIG. 6 is a flow diagram of a methodology for managing a transmission of multiplexed control information and data.

Referring to FIGS. 5-6, methodologies for multiplexing control information and data are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 5, illustrated is a methodology 500 for transmitting control information in a wireless communication system (e.g., system 200). It is to be appreciated that methodology 500 can be performed by, for example, a user device (e.g., a terminal 210) and/or any other appropriate network entity. Methodology 500 begins at block 502, wherein control information (e.g., control information provided by a control information generator 212) to be transmitted at a given subframe is received. Control information received at block 502 can include CQI information, ACK indications, MIMO support signaling, precoding information, and/or any other suitable control information. Once control information is received at block 502, a determination can be made at block 504 as to whether data (e.g., from a data source 214) is to be transmitted with the control information on a common subframe. In one example, a system in which methodology 500 is employed can be constrained to single-carrier waveforms for transmission. Therefore, a structure utilized for transmission of control information can depend on whether data is present to be simultaneously transmitted with the control information.

If no data is present for transmission with the control information, methodology 500 can conclude by branching from block 504 to block 506, wherein the control information is transmitted (e.g., by a transmitter 220) using a predetermined modulation and coding scheme (MCS) and a reserved frequency band for control information. In one example, the reserved frequency band for control information used at block 506 can be allocated at the ends of the system bandwidth. To maximize frequency diversity of the control information, the control information can then be transmitted at block 506 at a first control band on one end of the system bandwidth during one half of a subframe (e.g., one slot) and at a second control band on the other end of the system bandwidth during the other half of the subframe. In one example, a control transmission at block 506 can be associated with a predetermined power and MCS in order to ensure the signal quality and reliability of the transmitted control information.

On the other hand, if data is to be transmitted with the control information, methodology 500 can instead branch to blocks 508-512 from block 504. As blocks 508-512 generally illustrate, if data is to be transmitted with control information, the control information can be embedded into a portion of system bandwidth at which the data is to be transmitted in order to preserve the single-carrier nature of a transmitted waveform. However, the data may utilize varying bandwidths, power levels, and/or MCSs, which may be different than the resources normally allocated for transmissions of only control information as shown at block 506. Further, because control multiplexed with the data will utilize the transmission properties of the data absent adjustment, the reliability of the control information embedded within the data resources can vary based on the properties used for the data transmission. As a result, to provide varying protection levels for the control information within the data resources, one or more parameters of the control information can be adjusted. For example, at block 508, a power offset can be applied to the control information (e.g., by a power adjustment component 216 and/or a signal generator 218) to preserve the signal quality of the control information. Additionally and/or alternatively, the MCS utilized for the control transmission could also be adjusted at block 508. Next, at block 510, the control information is multiplexed with the data (e.g., by a signal generator 218) on the frequency resources reserved for the data transmission. Finally, at block 512, the control information and data are transmitted using a bandwidth and MCS determined for the data transmission. By applying a power offset to the control information at block 508, the reliability of the control information in the data can be maintained despite the varying transmission properties that can be used for data transmission.

FIG. 6 illustrates a methodology 600 for managing a transmission of multiplexed control information and data. It is to be appreciated that methodology 600 can be performed by, for example, a user device and/or any other appropriate entity in a wireless communication system. In accordance with one aspect, methodology 600 assumes a transmission of multiplexed control and data and illustrates adjustments that can be performed to provide varying protection levels for control information embedded in data resources in such a transmission. Accordingly, methodology 600 begins at block 602, wherein data to be transmitted and control information to be transmitted within the data are received.

Next, at block 604, a signal quality for control transmissions is determined based on a power, bandwidth, and MCS reserved for control transmissions. In one example, the signal quality determined at 604 can be a baseline control signal quality that can be used for subsequent computations in methodology 600 to ensure that control information embedded into data resources are given at least the baseline signal quality. The baseline signal quality computed at block 604 can be based on, for example, a default power, bandwidth, and MCS allocated within a system in which methodology 600 is performed for transmissions of only control information.

Once a baseline signal quality is determined at block 604, methodology 600 can proceed to block 606, wherein a power offset to be applied to the control information received at block 602 is determined that maintains the control signal quality determined at block 604 in a data transmission having a determined bandwidth and MCS. In one example, control multiplexed with data can be transmitted using the bandwidth and MCS allocated for the data. Thus, a power offset computed at block 606 can be used to provide varying protection levels for the control information to ensure its reliability. After the power offset is determined at block 606, it can be applied to the control information at block 608. Methodology 600 can then conclude at block 610, wherein the data and control information are communicated in a common transmission using the predetermined bandwidth and MCS for transmission of the data. In one example, upon completing the adjustments to the control information at block 608, the control information and data can be multiplexed together and transmitted on resources allocated for data transmission using a MCS assigned to the data.

In accordance with one aspect, methodology 600 can be utilized to ensure that a quality level of control signaling transmitted with data at block 610 is at least as high as a baseline signal quality determined at block 604. Additionally, constraints can be imposed on methodology 600 such that a power offset is only applied to control information when it would increase the power of the control signaling. Thus, after a power offset is computed at block 606, methodology 600 can optionally proceed to block 620, wherein it is determined whether the power offset determined at block 606 is greater than zero (i.e., positive). In one example, a positive power offset computed at block 606 can indicate that additional power is needed for the control information to raise its signal quality to the baseline computed at block 604. Thus, upon determining that the power offset computed at block 606 is positive, methodology 600 can proceed from block 620 to block 604 to apply the computed power offset. Methodology 600 can then subsequently continue as described above.

In contrast, a negative or zero power offset computed at block 606 can indicate that the signal quality of the control information is at least as high as the baseline computed at 604 without requiring any adjustments. Consequently, instead of applying a negative power offset to reduce the power of the control information, a power offset computed at block 606 can be disregarded at block 620 if the computed power offset is negative or zero. As an example, the power offset can be set to 0 dB or similarly replaced with a null power offset of 0 dB. Methodology 600 can then directly proceed to block 610 from block 620 to carry out control-data multiplexing and transmission.

Figure 7:
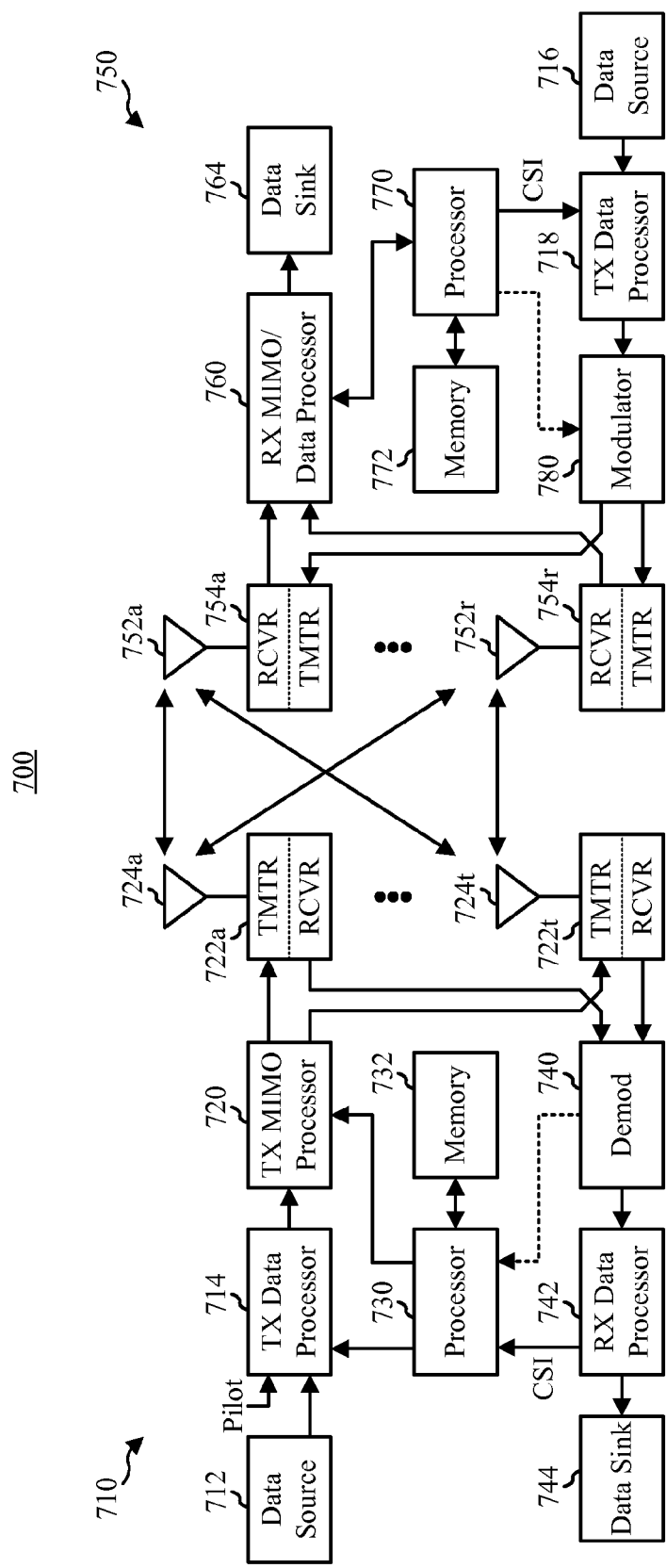
FIG. 7 is a block diagram illustrating an example wireless communication system in which one or more embodiments described herein may function.

Referring now to FIG. 7, a block diagram illustrating an example wireless communication system 700 in which one or more embodiments described herein can function is provided. In one example, system 700 is a multiple-input multiple-output (MIMO) system that includes a transmitter system 710 and a receiver system 750. It should be appreciated, however, that transmitter system 710 and/or receiver system 750 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 710 and/or receiver system 750 described herein could be utilized in connection with a single output to single input antenna system.

In accordance with one aspect, traffic data for a number of data streams are provided at transmitter system 710 from a data source 712 to a transmit (TX) data processor 714. In one example, each data stream can then be transmitted via a respective transmit antenna 724. Additionally, TX data processor 714 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 750 to estimate channel response. Back at transmitter system 710, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 730.

Next, modulation symbols for all data streams can be provided to a TX processor 720, which can further process the modulation symbols (e.g., for OFDM). TX MIMO processor 720 can then provides $N_T$ modulation symbol streams to $N_T$ transceivers 722a through 722t. In one example, each transceiver 722 can receive and process a respective symbol stream to provide one or more analog signals. Each transceiver 722 can then further condition (e.g., amplify, filter, and upconvert) the analog signals to provide a modulated signal suitable for transmission over a MIMO channel. Accordingly, $N_T$ modulated signals from transceivers 722a through 722t can then be transmitted from $N_T$ antennas 724a through 724t, respectively.

In accordance with another aspect, the transmitted modulated signals can be received at receiver system 750 by NR antennas 752a through 752r. The received signal from each antenna 752 can then be provided to respective transceivers 754. In one example, each transceiver 754 can condition (e.g., filter, amplify, and downconvert) a respective received signal, digitize the conditioned signal to provide samples, and then processes the samples to provide a corresponding "received" symbol stream. An RX MIMO/data processor 760 can then receive and process the NR received symbol streams from $N_R$ transceivers 754 based on a particular receiver processing technique to provide $N_T$ "detected" symbol streams. In one example, each detected symbol stream can include symbols that are estimates of the modulation symbols transmitted for the corresponding data stream. RX processor 760 can then process each symbol stream at least in part by demodulating, deinterleaving, and decoding each detected symbol stream to recover traffic data for a corresponding data stream. Thus, the processing by RX processor 760 can be complementary to that performed by TX MIMO processor 720 and TX data processor 714 at transmitter system 710. RX processor 760 can additionally provide processed symbol streams to a data sink 764.

In accordance with one aspect, the channel response estimate generated by RX processor 760 can be used to perform space/time processing at the receiver, adjust power levels, change modulation rates or schemes, and/or other appropriate actions. Additionally, RX processor 760 can further estimate channel characteristics such as, for example, signal-to-noise-and-interference ratios (SNRs) of the detected symbol streams. RX processor 760 can then provide estimated channel characteristics to a processor 770. In one example, RX processor 760 and/or processor 770 can further derive an estimate of the "operating" SNR for the system. Processor 770 can then provide channel state information (CSI), which can comprise information regarding the communication link and/or the received data stream. This information can include, for example, the operating SNR. The CSI can then be processed by a TX data processor 718, modulated by a modulator 780, conditioned by transceivers 754a through 754r, and transmitted back to transmitter system 710. In addition, a data source 716 at receiver system 750 can provide additional data to be processed by TX data processor 718.

Back at transmitter system 710, the modulated signals from receiver system 750 can then be received by antennas 724, conditioned by transceivers 722, demodulated by a demodulator 740, and processed by a RX data processor 742 to recover the CSI reported by receiver system 750. In one example, the reported CSI can then be provided to processor 730 and used to determine data rates as well as coding and modulation schemes to be used for one or more data streams. The determined coding and modulation schemes can then be provided to transceivers 722 for quantization and/or use in later transmissions to receiver system 750. Additionally and/or alternatively, the reported CSI can be used by processor 730 to generate various controls for TX data processor 714 and TX MIMO processor 720. In another example, CSI and/or other information processed by RX data processor 742 can be provided to a data sink 744.

In one example, processor 730 at transmitter system 710 and processor 770 at receiver system 750 direct operation at their respective systems. Additionally, memory 732 at transmitter system 710 and memory 772 at receiver system 750 can provide storage for program codes and data used by processors 730 and 770, respectively. Further, at receiver system 750, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 8:
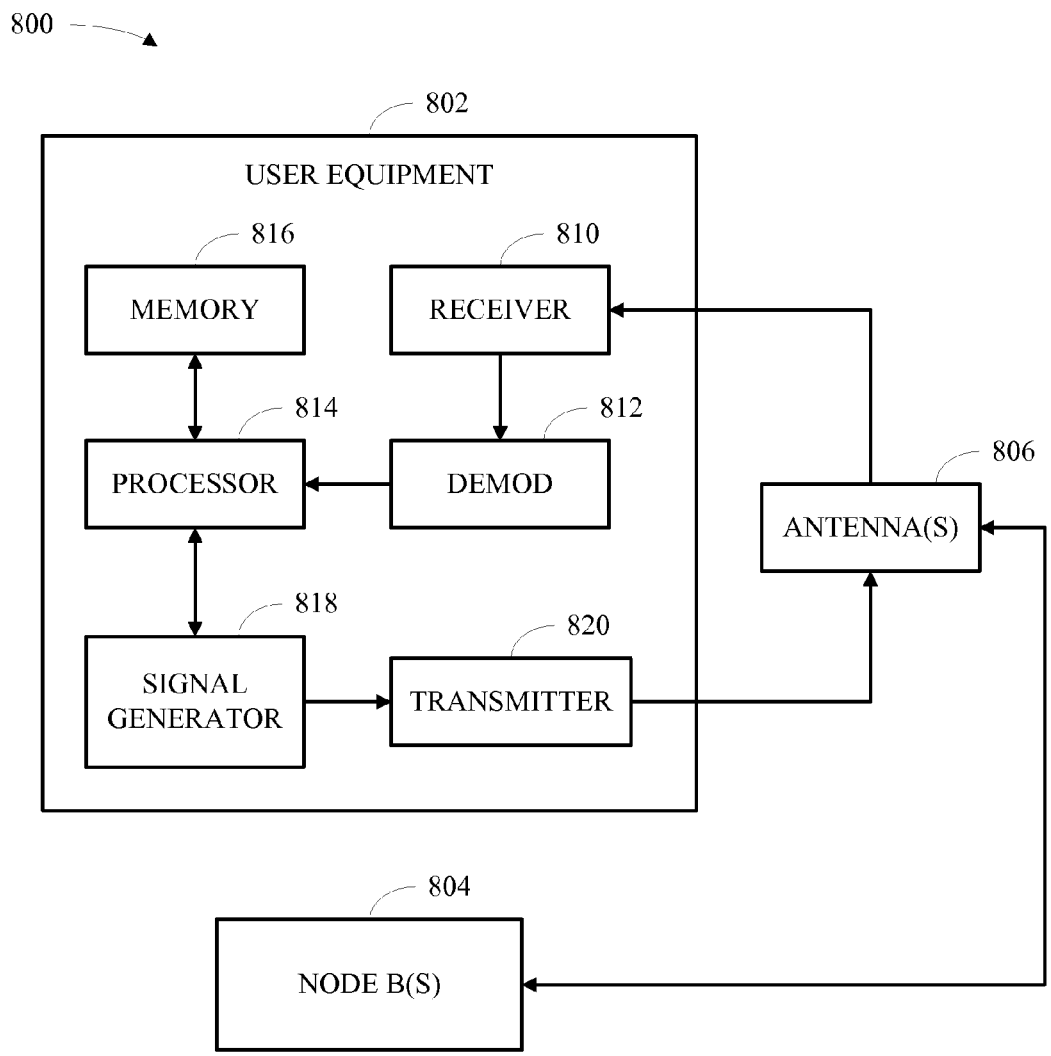
FIG. 8 is a block diagram of a system that coordinates multiplexing and transmission of control information and data with varying power offsets in accordance with various aspects.

FIG. 8 is a block diagram of a system 800 that coordinates multiplexing and transmission of control information and data with varying power offsets in accordance with various aspects described herein. In one example, system 800 includes user equipment (UE) 802. As illustrated, UE 802 can receive signal(s) from one or more Node Bs 804 and transmit to the one or more Node Bs 804 via one or more antennas 806. Additionally, UE 802 can comprise a receiver 810 that receives information from antenna(s) 806. In one example, receiver 810 can be operatively associated with a demodulator (Demod) 812 that demodulates received information. Demodulated symbols can then be analyzed by a processor 814. Processor 814 can be coupled to memory 816, which can store data and/or program codes related to UE 802.

UE 802 can additionally employ a signal generator 818, which can employ a modulator, a multiplexer, and/or other appropriate components to generate signals for transmission by a transmitter 820 through antenna(s) 806. In accordance with one aspect, signal generator 818 can employ one or more techniques for coordinating transmission of data and control information as generally described supra. Further, signal generator 818 and/or processor 814 can be employed by UE 802 to perform methodologies 500, 600, and/or other similar and appropriate methodologies.

Figure 9:
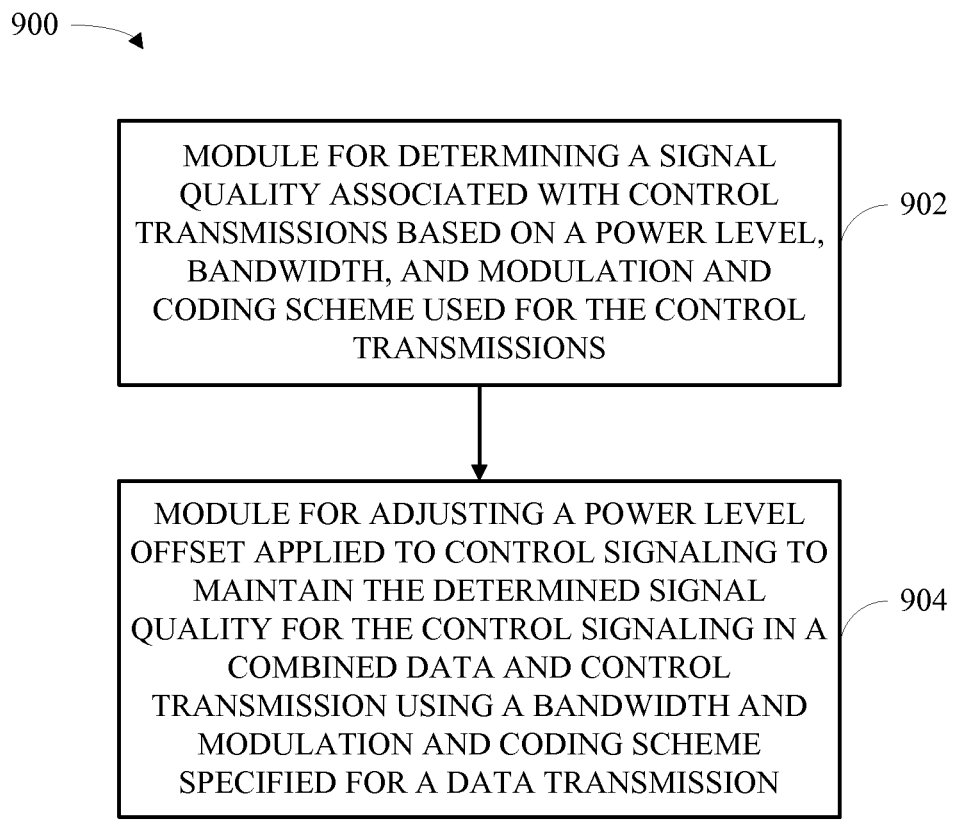
FIG. 9 is a block diagram of an apparatus that facilitates the application of a power offset to control signaling for a common transmission of the control signaling and data in a wireless communication system.

FIG. 9 illustrates an apparatus 900 that facilitates the application of a power offset to control signaling for a common transmission of the control signaling and data in a wireless communication system (e.g., system 200). It is to be appreciated that apparatus 900 is represented as including functional blocks, which can be functional blocks that represent functions implemented by a processor, software, or combination thereof (e.g., firmware). Apparatus 900 can be implemented in a terminal (e.g., terminal 210) and/or another suitable network entity and can include a module 902 for determining a signal quality associated with control transmissions based on a power level, bandwidth, and modulation and coding scheme (MCS) used for the control transmissions; and a module 904 for adjusting a power level offset applied to control signaling to maintain the determined signal quality for the control signaling in a combined data and control transmission using a bandwidth and MCS specified for a data transmission.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for managing control information and data to be transmitted in a wireless communication system, comprising:
   receiving the control information and the data to be transmitted with the control information;
   determining a baseline signal quality level used for transmission of the control information;
   identifying a bandwidth and a modulation and coding scheme (MCS) specified for transmission of the data;
   determining a power offset for a transmission of the control information such that a control signal quality of the transmission of the control information using the bandwidth and the MCS specified for transmission of the data, is greater than or equal to the baseline signal quality level;
   applying the power offset to the control information; and
   multiplexing the control information with the data.

2. The method of claim 1, further comprising transmitting the control information multiplexed with the data within a frequency band allocated for transmission of the data.

3. The method of claim 2, wherein the transmitting comprises applying the MCS specified for transmission of the data to the control information multiplexed with the data.

4. The method of claim 2, wherein the transmitting comprises transmitting the control information using a fixed MCS that is independent of the MCS specified for transmission of the data.

5. The method of claim 2, wherein the transmitting comprises transmitting the control information multiplexed with the data on one or more contiguous frequency subcarriers such that the control information and the data are transmitted as a frequency localized waveform.

6. The method of claim 2, wherein determining the baseline signal quality level is based on a default power, bandwidth, and MCS used for transmission of the control information.

7. The method of claim 2, wherein the multiplexing of the control information and the data comprises multiplexing the control information and the data such that the control information and the data span a transmission time interval.

8. The method of claim 1, wherein the determining the power offset comprises:
 determining the power offset such that a signal quality level for the control information multiplexed with the data is equal to the baseline signal quality level for the control information associated with a transmission of the control information without the data.

9. The method of claim 1, wherein the control information comprises one or more of an acknowledgement (ACK) and a channel quality indicator (CQI).

10. The method of claim 9, wherein the multiplexing comprises rate matching one or more CQIs to the data such that the CQIs and the data occupy separate resources within a frequency band allocated for the data.

11. The method of claim 9, wherein the multiplexing comprises scheduling one or more ACKs and the data such that transmission of the one or more ACKs punctures respective portions of the data.

12. A wireless communications apparatus, comprising:
 a memory that:
  stores information relating to control signaling and data for communication in a common transmission, and
  stores information relating to bandwidth and a modulation and coding scheme (MCS) reserved for transmission of the data; and
 a processor configured to:
  determine a baseline signal quality level for transmission of the control signaling,
  determine an amount to offset power of the control signaling such that a signal quality for transmission of the control signaling using the bandwidth and the MCS specified for transmission of the data is greater than or equal to the baseline signal quality level,
  apply the determined amount of offset power to the control signaling, and
  multiplex the control signaling with the data.

13. The wireless communications apparatus of claim 12, wherein the memory further stores information relating to a contiguous set of frequency subcarriers specified for transmission of the data and the processor is further configured to instruct transmission of the control signaling and the data over the contiguous set of frequency subcarriers specified for transmission of the data.

14. The wireless communications apparatus of claim 13, wherein the the processor is further configured to instruct transmission of the control signaling and the data using the MCS specified for transmission of the data.

15. The wireless communications apparatus of claim 13, wherein the processor is further configured to generate a waveform for transmission of the control signaling and multiplexed with the data using Localized Frequency Division Multiplexing (LFDM).

16. The wireless communications apparatus of claim 15, wherein the processor is further configured to multiplex the control signaling and the data as a series of LFDM symbols comprising respective portions of the control signaling.

17. The wireless communications apparatus of claim 13, wherein the processor is further configured to determine the baseline signal quality level based on a power spectral density (PSD), bandwidth, and MCS reserved for transmission of the control signaling.

18. The wireless communications apparatus of claim 13, wherein the processor is further configured to schedule the control signaling and the data in time such that a transmission of the control signaling and the data spans a transmission time interval.

19. The wireless communications apparatus of claim 12, wherein the processor is further configured to determine the amount to offset the power of the control signaling such that a signal quality level of the control signaling multiplexed with the data is equal to the baseline signal quality level.

20. The wireless communications apparatus of claim 12, wherein the control signaling comprises at least one of acknowledgement (ACK) signaling and channel quality indicators (CQI) signaling.

21. The wireless communications apparatus of claim 20, wherein the memory further stores information relating to a frequency band allocated for transmission of the data and the processor is further configured to rate match CQI signaling to the data such that the CQI signaling and the data occupy separate resources within the frequency band allocated for transmission of the data.

22. The wireless communications apparatus of claim 20, wherein the processor is further configured to schedule transmission of ACK signaling such that transmission of the ACK signaling punctures transmission of the data.

23. An apparatus that facilitates multiplexing of control information and data in a wireless communication system, comprising:
 means for identifying the control information to be transmitted and the data to be transmitted with the control information;
 means for determining a baseline signal quality level used for transmission of the control information;
 means for identifying a bandwidth and a modulation and coding scheme (MCS) specified for transmission of the data;
 means for determining a power offset for a transmission of the control information such that a control signal quality of the transmission of the control information using the bandwidth and the MCS specified for transmission of the data, is greater than or equal to the baseline signal quality level;
 means for applying the power offset to the control information; and
 means for multiplexing the control information with the data.

24. A non-transitory computer-readable medium, comprising:
 code for causing a computer to receive data to be transmitted and a bandwidth and a modulation and coding scheme (MCS) specified for transmission of the data;
 code for causing a computer to receive control signaling to be transmitted with the data;
 code for causing a computer to determine a baseline signal quality level used for transmission of the control signaling;
 code for causing a computer to determine a power offset for a transmission of the control information such that a control signal quality of the transmission of the control information using the bandwidth and the MCS specified for transmission of the data, is greater than or equal to the baseline signal quality level; and code for causing a computer to embed the control signaling into the bandwidth specified for transmission of the data using the MCS specified for transmission of the data.

\* \* \* \* \*